US009608299B2

(12) United States Patent
Adams et al.

(10) Patent No.: US 9,608,299 B2
(45) Date of Patent: Mar. 28, 2017

(54) BATTERY AND BATTERY-SENSING APPARATUSES AND METHODS

(75) Inventors: Douglas E. Adams, West Lafayette, IN (US); James M. Caruthers, Lafayette, IN (US); Farshid Sadeghi, West Lafayette, IN (US); Mark D. Suchomel, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 227 days.

(21) Appl. No.: 14/124,819

(22) PCT Filed: Jun. 8, 2012

(86) PCT No.: PCT/US2012/041641
§ 371 (c)(1),
(2), (4) Date: May 21, 2014

(87) PCT Pub. No.: WO2012/170873
PCT Pub. Date: Dec. 13, 2012

(65) Prior Publication Data
US 2014/0255738 A1    Sep. 11, 2014

Related U.S. Application Data

(60) Provisional application No. 61/494,661, filed on Jun. 8, 2011.

(51) Int. Cl.
*H01M 10/42* (2006.01)
*H01M 10/48* (2006.01)
H01M 2/34 (2006.01)

(52) U.S. Cl.
CPC ....... *H01M 10/4285* (2013.01); *H01M 10/48* (2013.01); *H01M 10/482* (2013.01); *H01M 10/486* (2013.01); H01M 2/345 (2013.01)

(58) Field of Classification Search
None
See application file for complete search history.

(56) References Cited

U.S. PATENT DOCUMENTS

| 5,321,627 A | 6/1994 | Reher |
| 2008/0090134 A1 | 4/2008 | Berg |

FOREIGN PATENT DOCUMENTS

JP    2006012761    1/2006

OTHER PUBLICATIONS

English translation of Ishikura, JP 2006-012761 Published Jan. 12, 2006.*

(Continued)

*Primary Examiner* — Sarah A Slifka
(74) *Attorney, Agent, or Firm* — John V. Daniluck; Bingham Greenebaum Doll LLP

(57)    ABSTRACT

Apparatuses and methods for determining one or more performance related characteristics (such as state of charge and/or health) of one or more electrochemical cells that store and release electrical energy are disclosed. Embodiments include pressure and/or temperature sensors that sense a change in pressure resulting from the tendency of the electrochemical cell to change volume and/or the temperature of the one or more electrochemical cells as the electrochemical cell(s) are charged or discharged. Alternate embodiments include one or more calculating members that receive pressure and/or temperature information from the pressure and/or temperature sensing members and calculate a performance related characteristic of the electrochemical cell. Still further embodiments include determining one or more performance related characteristics of an electrochemical cell by sensing the tendency of an electrochemical (Continued)

cell to change volume (such as by sensing pressure) and/or by sensing the temperature as the electrochemical cell is charged or discharged.

18 Claims, 15 Drawing Sheets

(56) References Cited

OTHER PUBLICATIONS

International Preliminary Report on Patentability issued in PCT/US2012/041641 Dec. 27, 2013.
International Search Report and Written Opinion issued in PCT/US2012/041641 Jan. 31, 2012.

* cited by examiner

BATTERY AND BATTERY-SENSING APPARATUSES AND METHODS

This application is a National Stacie of International Application No. PCT/US2012/041641, filed Jun. 8, 2012, which claims the benefit of U.S. Provisional Patent Application No. 61/494,661, filed Jun. 8, 2011, the entireties of which are hereby incorporated herein by reference.

GOVERNMENT RIGHTS

This invention was made with government support under Grant No. N10A-013-0259 awarded by the U.S. Navy. The U.S. government has certain rights in the invention.

BACKGROUND

Some current battery monitoring technology measures the global pressure in the battery, as well as other global variables such as voltage and current, as well as the temperature at one or a few locations in the battery system. While these measurements of the global state of the battery may provide information related to the operation of the battery, these measurements are frequently insufficient to determine the onset of a failure event in the battery. Battery failure is an inherently local phenomenon, where the electrochemical reactions that begin locally can rapidly accelerate leading to global failure, which can have potentially catastrophic consequences.

SUMMARY

Embodiments of the present disclosure include improved battery sensing apparatuses and methods.

Various embodiments use two dimensional sensors to detect various performance related characteristics of the battery, such as the battery's state of charge (SOC) and/or the battery's state of health (SOH).

Alternate embodiments of the present disclosure determine the initiation of local failure events in batteries before they cascade into global battery failure, the determination capable of being accomplished by a computer, controller or similar device.

Some embodiments of the present disclosure pertain to spatial and temporal fidelity sensors for monitoring battery systems.

Some embodiments detect the tendency of a battery to change volume (expand and/or contract) during operation (which includes charging and/or discharging). While a measurable change in volume may or may not result (such as under a constant external pressure) during operation, some embodiments detect a change in pressure that results from operation of the battery while the battery cells are positioned within a structure that resists the battery cell's tendency to change volume (an external pressure that increases as the battery cells attempt to expand), such as a battery housing. Certain embodiments pertain to a two dimensional measurement of the pressure distribution across an external and/or internal surface of a battery, and/or a battery housing or assembly.

Yet other embodiments detect the tendency of a battery to generate heat during charging and/or discharging. Certain embodiments pertain to the two dimensional measurement of temperature across an external and/or internal surface of a battery assembly.

Yet other embodiments pertain to multidimensional arrays of sensors that measure localized phenomena as a battery is charged and/or discharged. As examples, the physical responses can be one or both of temperature or pressure, and the measured data can be a response to that pressure or temperature change that produces a change in sensor output voltage, a change in radiation (such as in the visible spectrum), a change in the on/off states of electronic switches (such as to produce a digital response), and others.

Yet other embodiments of the present disclosure pertain to the measurement of localized changes that result from the intercalation of active material in the anodes and/or cathodes.

Yet other embodiments pertain to the statistical analysis of an array of data acquired during charging or discharging the battery. In some embodiments, the statistical analysis includes the calculation of one or more indices that pertain to the variation in a measured phenomenon (such as pressure or temperature) over an area, or within the volume, of a battery.

In yet other embodiments, the SOH of a battery (which can include the state of damage to the battery), for example a rechargeable battery (such as a Lithium Ion ("Li-ion")), can be quantified by the change in heterogeneity (e.g., non-uniformity) in an array of data relating to physical properties of the battery (such as pressure and/or temperature). In some embodiments, a characteristic (e.g., the standard deviation) of physical property measurements at a low SOC is compared to a characteristic (e.g., the standard deviation) of the physical property measurements at a higher SOC. In yet other embodiments, the standard deviation within a set of physical property measurements early in the lifetime of the battery can be compared to the standard deviation of these same measurements later in the life of the battery. Such comparisons of heterogeneity provide an indicator of the state of battery charge in some embodiments. In yet other embodiments, the change in heterogeneity provides an indication of the age of the battery. In yet other embodiments, the change in heterogeneity provides an indication of the damage accumulated by the battery.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

DETAILED DESCRIPTION OF THE ILLUSTRATIVE EMBODIMENTS

Figure 1:
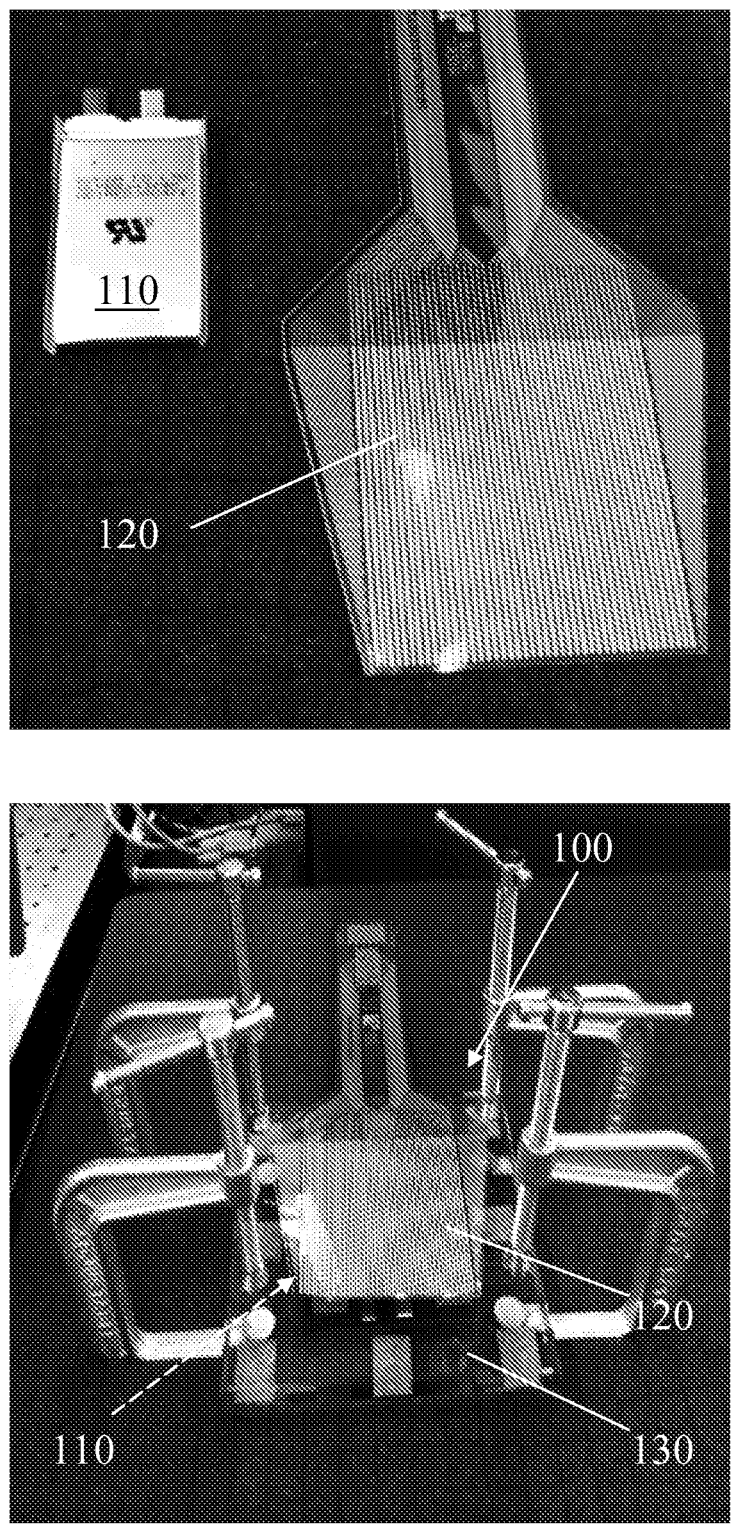
FIG. 1: A battery and sensor device according to one embodiment of the present disclosure. Top: Disassembled view of the battery and detector. Bottom: Assembled battery and sensor device with clamping assembly, battery, sensor, and plates.

For the purposes of promoting an understanding of the principles of the disclosure, reference will now be made to one or more embodiments illustrated in the drawings and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to "advantages" provided by some embodiments, other embodiments may not include those same advantages, or may include different advantages. Any advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

One embodiment of the present disclosure monitors the two-dimensional (2D) pressure and/or temperature distribution on the surface of the battery, where the heterogeneity in the 2D pressure and temperature response is an early reporter of damage in the battery. In yet other embodiments the 2D pressure distribution is monitored to detect damage in the battery. In still other embodiments the 2D temperature distribution is monitored to detect battery damage.

In one embodiment a 2D pressure sensor array is placed in contact with a battery (e.g., a Li-ion battery), such as in a constrained assembly. As the Li shuttles back-and-forth between the anode and cathode during charging/discharging, there is a volume change as the Li intercalates in the active material in the anode and cathode.

In one embodiment the change in volume may be detected by the battery and the 2D pressure sensor being mechanically constrained (such as with one or more constraining structures, e.g., plates) with the change in volume of the anode and cathode material leading to a change in pressure.

Damaged batteries (including those with only minor damage) may be distinguished from undamaged batteries by measuring the relative change in the pressure distribution as the battery is being charged and/or discharged despite there being little or no ability to detect the difference between a slightly damaged and undamaged battery when measuring the voltage vs. state-of-charge or other global characteristics, such as the average pressure. In at least one embodiment, a statistical measure of the pressure distribution (one example being the standard deviation) as the battery is being charged/discharged is used to distinguish between batteries that have been damaged and batteries that have not been damaged.

Some embodiments include devices that detect battery failure as it begins to occur as one or more local events (such local events including local events that change the local rate or electrochemical reaction with associated changes in pressure, temperature and/or other physical variables) which frequently increase the heterogeneity of the 2D spatial field. If the measurement from the 2D sensor is such that the 2D spatial fields are not attenuated by various transport mechanisms, statistical analysis of the heterogeneity of the spatial distribution of pressure, temperature and/or other quantities can provide an early reporter of damage in a battery, which include but are not limited to Li-ion based battery systems.

One theory explaining how battery damage may occur is that battery damage (such as damage to a Li-ion battery) begins as a local event. More specifically, when a cell is damaged it causes a change in the electrochemical reactions in at least one localized region of the cell. For cells that behave like this (which is thought to include Li-ion battery cells), the measurement of global quantities (e.g. the overall cell voltage, current, etc.) is not an accurate reporter of local damage, at least in part because these quantities are averaged over all of the electrochemically active parts of the cell. Some embodiments of the present disclosure pertain to the measurement of local phenomenon such as pressure or temperature. At least one embodiment measures two different local quantities, e.g., the 2D temperature distribution (which can include measuring localized temperature gradients) and the 2D pressure distribution (which can include measuring localized pressure gradients). Alternate embodiments of the present disclosure include sensors that directly measure other quantities that vary according to phenomenon such as pressure or temperature.

In addition to heat generated by current passing through a battery cell (joule heating), electrochemical reactions within batteries typically generate heat, and changes in the local rate of the electrochemical reaction will generally affect the local temperature field. Thermal diffusion will generally attenuate the local variability in the temperature field. For various types of battery systems (e.g., Li-ion battery systems) there is expansion/contraction as the lithium ions shuttle back and forth during charging/discharging. As such, a change in the local rate of the electrochemical reaction (which may be caused by damage to the battery) can potentially effect local changes in the pressure distribution due to different rates of Li intercalation in the anode and/or cathode. In some embodiments, the pressure distribution is a good early reporter of damage batteries, such as Li-ion batteries. In yet other embodiments, the temperature distribution is a good early reporter of damage. Various embodiments use sensors (e.g., temperature and or pressure sensors) that are externally located on (e.g., attached to) the battery cell. However, other embodiments of the present disclosure contemplate the use of sensors provided within the battery (e.g., within the battery outer casing) for measurements of 2D local phenomenon.

In one embodiment, an array detector (e.g., a pressure sensitive array detector) is held in place on the surface of a battery by a support structure, such as a plate (e.g., a glass plate). Changes in the volume of the battery during charging and/or discharging result in changes in the pressures detected by the pressure sensitive array detector.

In alternate embodiments, the support structure may extend to the opposite side of the battery from the array detector and/or a separate structure may be included on the opposite side of the battery from the array detector. The support structure on the opposite side of the battery from the array detector can assist in restraining the expansion of the battery and enhance the ability of the array detector(s) to sense the expansion and/or contraction of the battery. As the battery is charged and/or discharged, the pressure (and/or temperature) sensed by the two dimensional array changes.

Still other embodiments include array detectors that are held in place on opposite sides of a battery, array detectors that surround a battery, and array detectors that are in contact with one or more portions of the battery.

In alternate embodiments, a pressure sensitive array detector is located within the interior region of the battery's outer casing, such as between one or more battery cells and the outer casing, between individual battery cells, and/or between one or more anodes and one or more cathodes. As the battery is charged and/or discharged, the pressure sensed by the array sensor changes. Although array detector 120 is depicted as a two-dimensional array of sensors, alternate embodiments include one-dimensional arrays, and three-dimensional arrays (which may include, for example, multiple 2D arrays of sensors, and non-planar arrays of sensors), and the arrays may include rigid and/or flexible portions.

One embodiment includes a pressure sensitive array detector (e.g., a Tekscan Sensor Model Number 5076) held on the outer surface of a Li-ion battery (e.g., a Kokam Superior Lithium Polymer Battery, such as Model SLPB834374H, which uses a flexible pouch as the outer surface of the battery) by an outer support structure (e.g., two glass plates).

Batteries of at least one embodiment of the present disclosure were tested in both damaged and undamaged states. In one example series of tests, a number of Kokam Superior Lithium Polymer Batteries (Model SLPB834374H) were evaluated, including both undamaged batteries as well as batteries subjected to a mechanical trauma. The Kokam batteries, which are relatively small in size, are based upon carbon/lithium cobalt dioxide ($LiCoO_2$) and carbon/lithium cobalt manganese nickel oxide ($LiMnNiCoO_2$) chemistry. The batteries are 2.9 in by 1.7 in with 2000 mAh capacity with a voltage range from 2.8V in the uncharged state and 4.2V in the fully charged state. The manufacturer recommends that 4.2±0.03V is the maximum state—overcharging occurring for voltages in excess of 4.2V. The $C/LiCoO_2/LiMnNiCoO_2$ chemistry is a relatively common Li-ion system. Although the use of a specific battery chemistry as developed by a particular manufacturer is shown and discussed in detail, the present disclosure is not so constrained. The methods and apparatus described herein are broadly applicable to any battery system in which there are a plurality of localized regions within the battery that respond physically to a performance related characteristic of the battery, such as the state of charge (SOC). These physical responses can be correlated to the SOC of the battery, and in some embodiments, to the detection of damage in the battery.

A battery and sensor device 100 according to one embodiment of the present disclosure is depicted in FIG. 1. The top portion of FIG. 1 depicts various components and the bottom portion depicts the assembled components. Testing was performed on a number of the battery and sensor devices 100. The batteries 110 in the tested embodiments were used as received from Kokam. The batteries 110 were packed in foam rubber to minimize mechanical trauma during shipping. For testing, the batteries 110 were placed next to a pressure sensitive array detector 120 (which in the depicted example shown in FIG. 1 was from Tekscan (Sensor Model Number 5076). The detector 120 had a 44 by 44 array of sensels each with a maximum range of 0 to 50 psi with a sensitivity of 0.2 psi. (As used herein, a "sensel" is a type of sensor similar to a pixel in a two dimensional color image). The battery 110 and pressure sensitive array 120 were constrained between two glass plates 130, where a nearly uniform pressure field could be applied. Using the array sensor 120, the tightening screws were adjusted so that a nearly spatially uniform pressure field was achieved when battery 110 was in the discharged state.

The pressure values were received by a calculating member, such as a computer with software. The pressure values recorded by the calculating member and its software were uncalibrated pressures from each sensel and ranged from 0 to 255 (8 binary bit data). Tekscan reports the range of the transducer is 0 to 50 psia. The software supplied a 2D color image, but no digital values from each sensel were provided. Thus, a screen image of the software display was made, and the image was imported into an analytical program (e.g., MatLab) where the scanned image was turned into RGB (red-green-blue) triples of numbers, the RGB numbers were converted into 13 equally spaced color bins. The pressure data reported in the rest of this report are integers from 0 to 13, which approximately correspond to pressures from 0 to 50 psia. However, yet other embodiments pertain to the use of sensors that provide data in any form, including as examples, digital and analog data.

Figure 2:
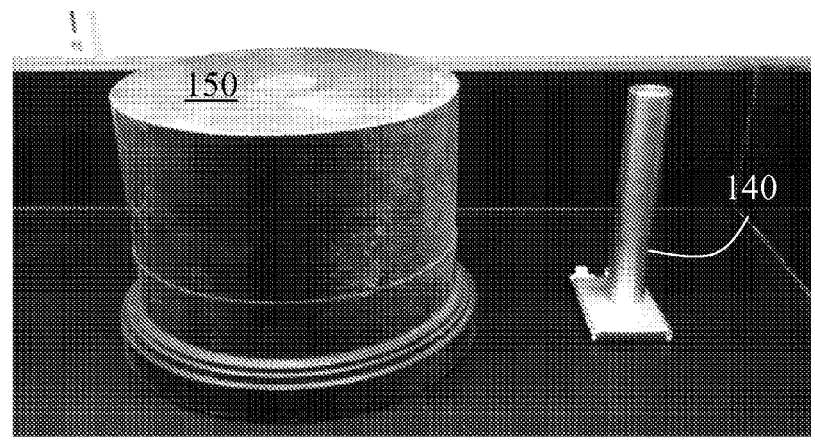
FIG. 2: Weight and rod for inflicting mechanical trauma to the battery.

Some batteries were used as received, while some were subjected to a mechanical trauma prior to testing. The various batteries discussed herein are:

Battery A: Undamaged. Clamp pressure in test rig was low (i.e. about 8 psi).
Battery B: Undamaged. Clamp pressure in test rig was high (i.e. about 13 psi).
Battery C: Damaged. A 13/16 in. diameter rod was placed on the battery and a 20 lb weight was gently placed on the rod. Clamp pressure in test rig was low (i.e. 8 psi).
Battery D: Damaged. A 7/8 in. diameter rod 140 was placed on the battery and a 50 lb weight 150 was gently placed on the rod (see FIG. 2). Clamp pressure in the test rig was high (i.e. about 13 psi).

Figure 3:
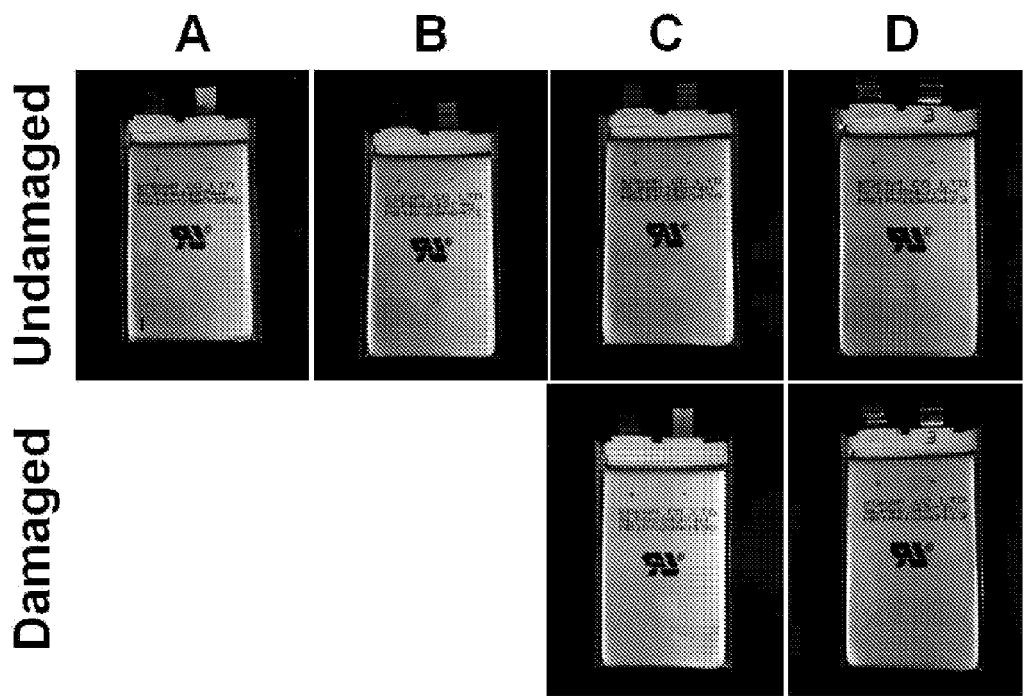
FIG. 3: Illustrations of the battery components prior to testing.

A photograph of all the batteries both before and after damage is shown in FIG. 3. There were no visible signs of the mechanical trauma to the batteries, which is similar to a type of damage that could occur during pack assembly or during operation. This type of damage could also occur from dropping the battery, dropping a tool on the battery or from placing too much weight on the battery.

Figure 4:
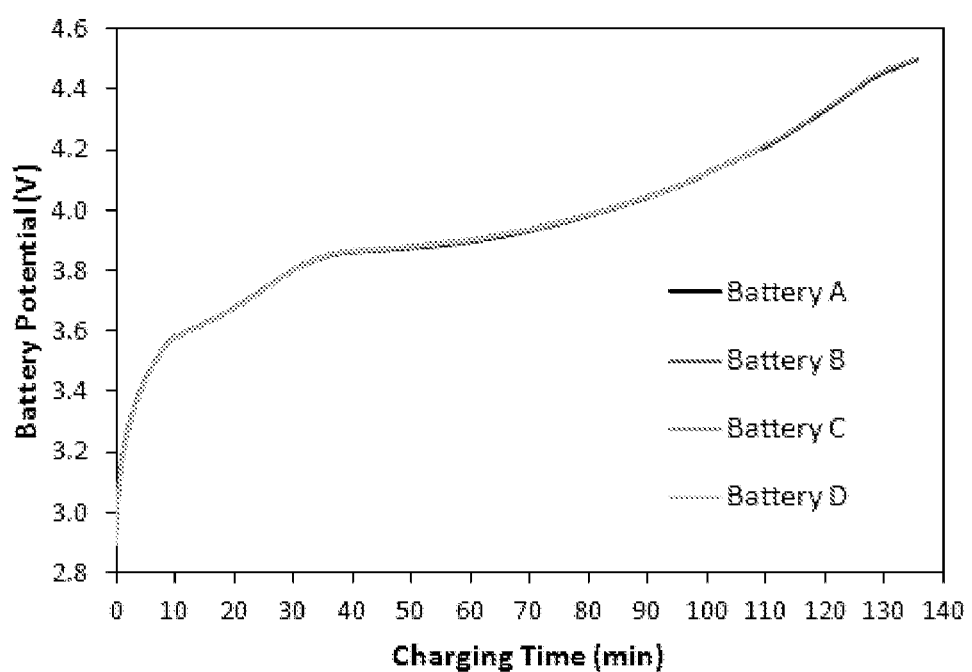
FIG. 4: Battery voltage vs. Charging Time for the tested battery components.

The voltage vs. charging time plot for Batteries A, B, C and D are shown in FIG. 4. The depicted results were for a typical charging cycle, and the individual plot lines are difficult to differentiate from one another since the data series plots overlap one another. The data series plots for all batteries begin at a time of 0 minutes, while the data series for Battery A and Battery C end at 135 min. and the data series Battery B and Battery D end at 108 min. The voltage vs. charging time plot reflects no discernable differences between the batteries, although it is possible that some differences between the batteries could potentially be discernible in the voltage vs. charging time plot after many charge/discharge cycles.

Figure 5:
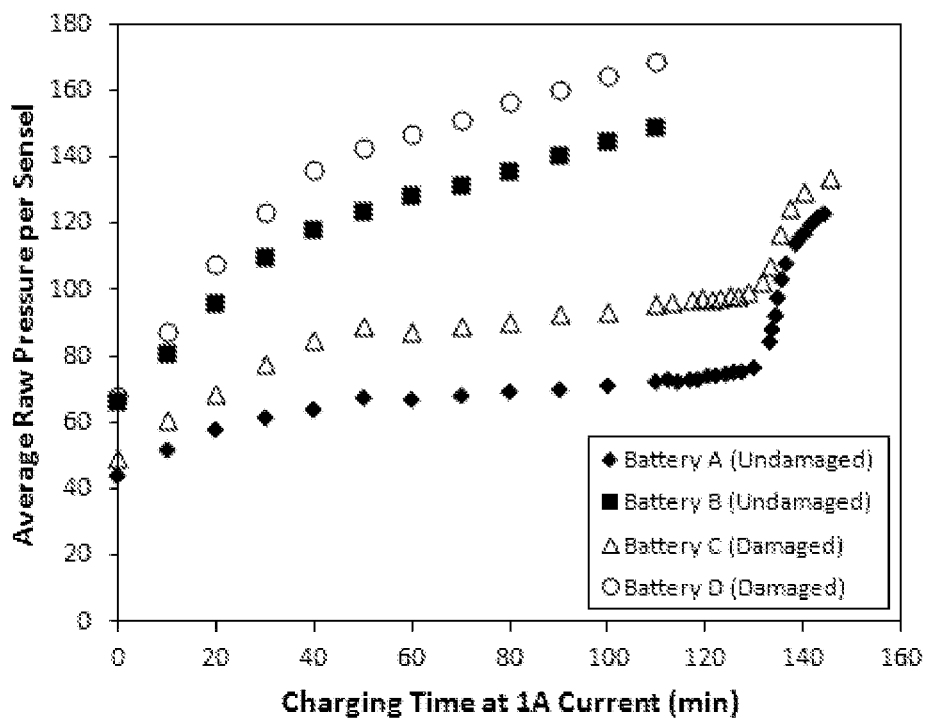
FIG. 5: Spatially averaged pressure during charging for the battery components.

The spatially average pressure of each battery was determined by averaging the intensity from each of the sensels from the pressure array detector. The average pressure on the initial charging cycle for each of the batteries is shown in FIG. 5. The average pressure depends upon (i) the pressure that is generated from the expansion/contraction of the anode and cathode as the lithium ions are intercalated during charging/discharging and (ii) the initial pressure applied to the battery and pressure array sensor.

Figure 6:
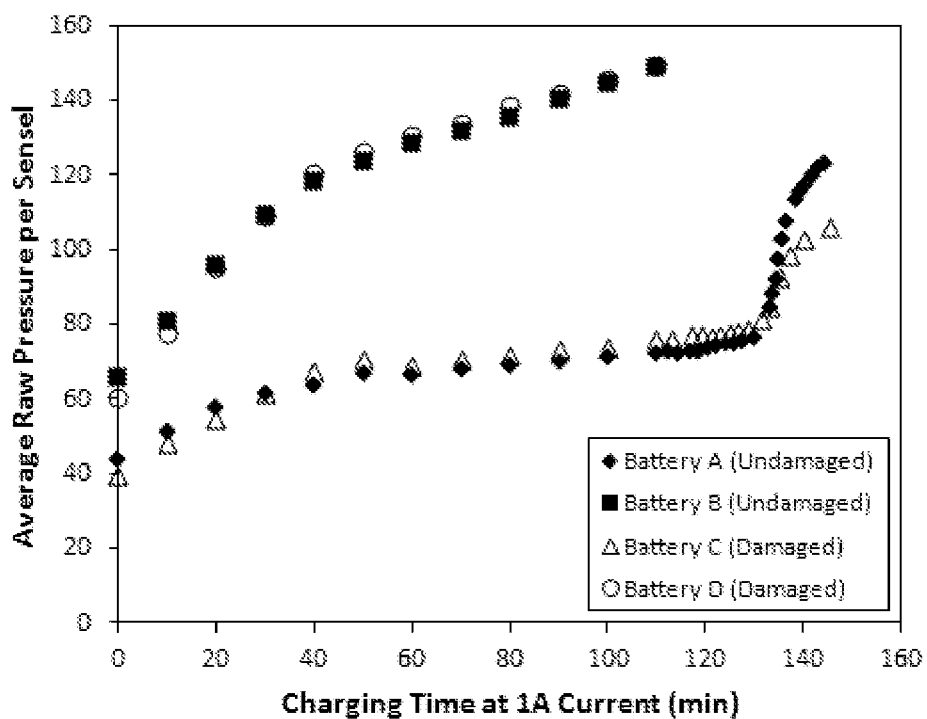
FIG. 6: Normalized pressure during charging for the battery components.
Figure 7A:
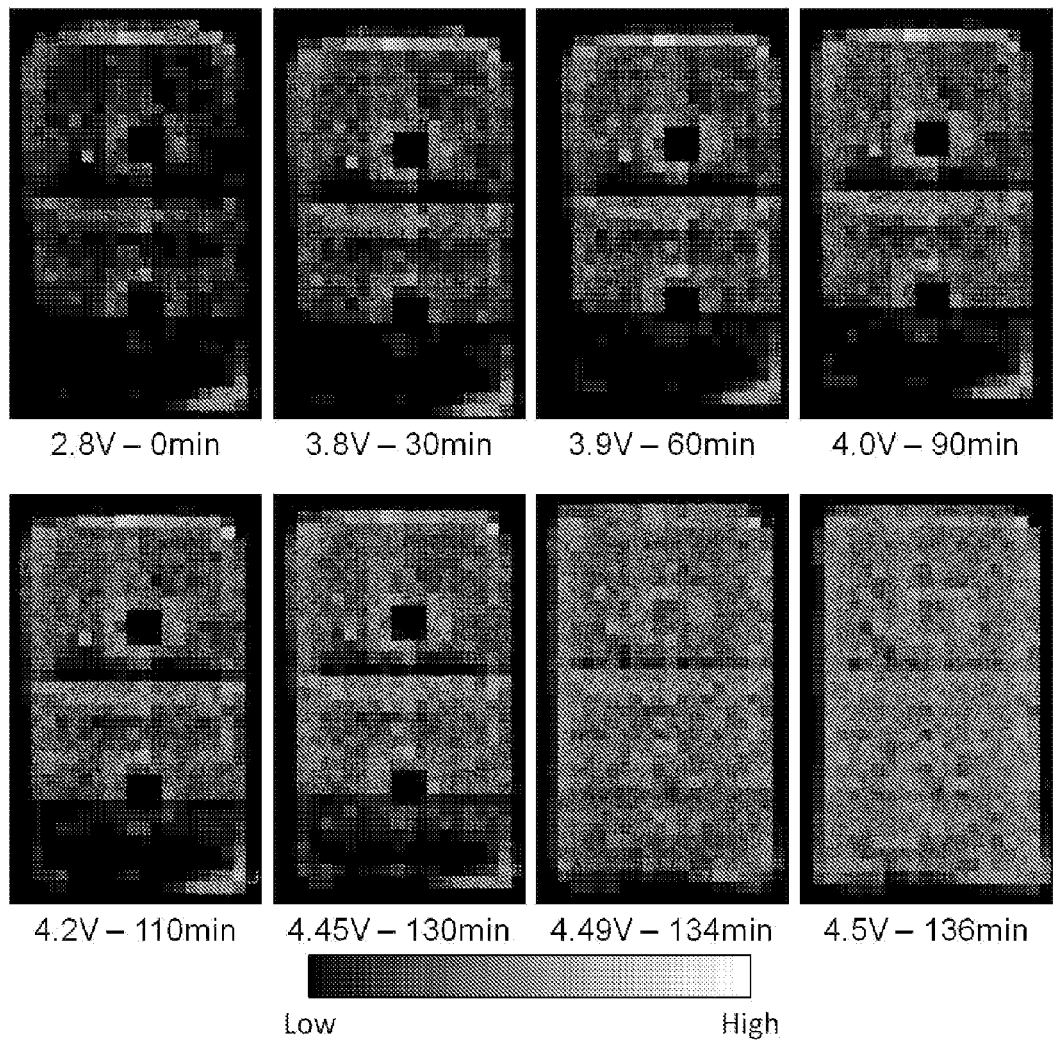
FIG. 7a: Pressure distribution of Battery A (undamaged battery with low applied clamping pressure) during charging at 1 A (0.5 C).
Figure 7B:
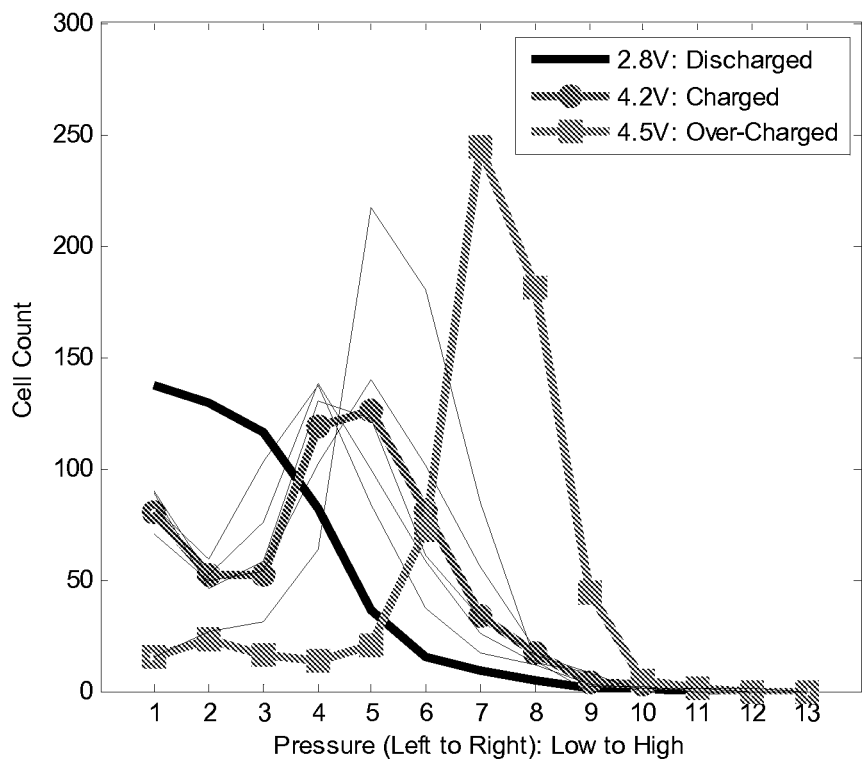
FIG. 7b: Distribution of pressure intensities for Battery A (undamaged battery with low clamping pressure). Line plot for all times/voltages during charging from 2.8V (0 min) to 4.5V (136 min), where the pressure distributions at discharged (2.8V), charged (4.2V) and over-charged (4.5V) are indicated respectively by heavy lines.
Figure 7C:
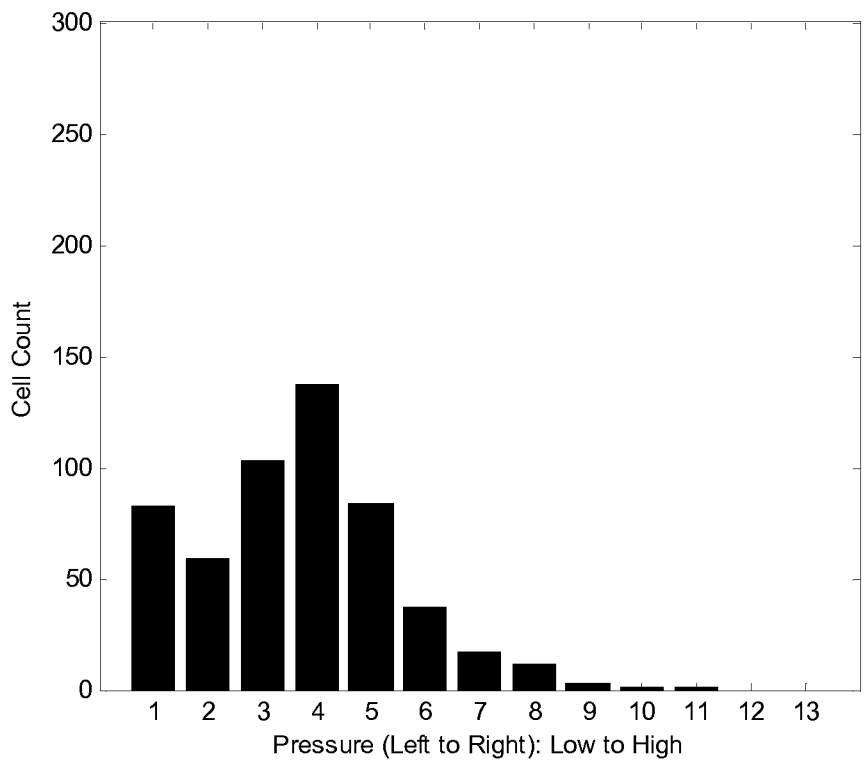
FIG. 7c: Distribution of pressure intensities for Battery A (undamaged battery with low clamping pressure). Bar plot of the pressure distribution at 3.8V (30 min.)
Figure 8A:
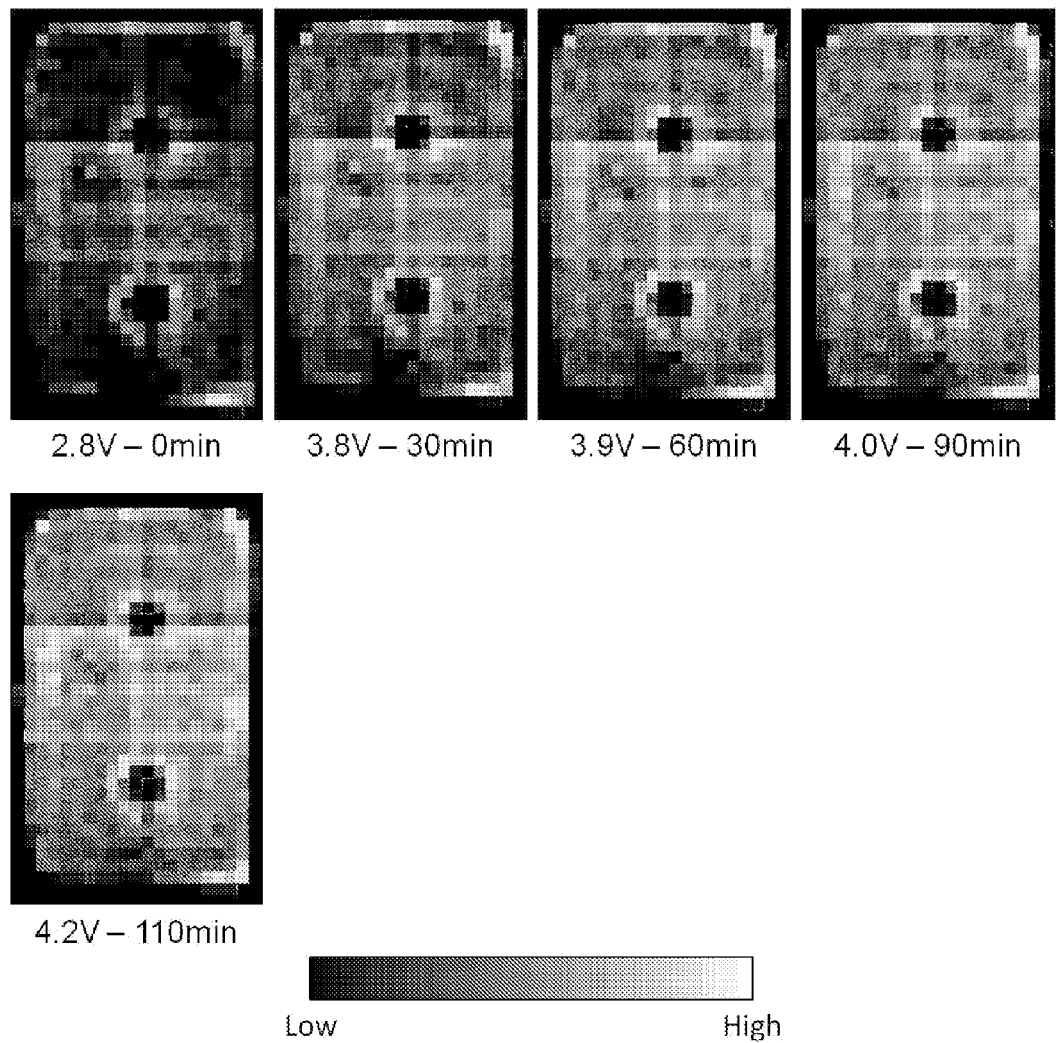
FIG. 8a: Pressure distribution of Battery B (undamaged with high applied clamping pressure) during charging at 1 A (0.5 C).
Figure 8B:
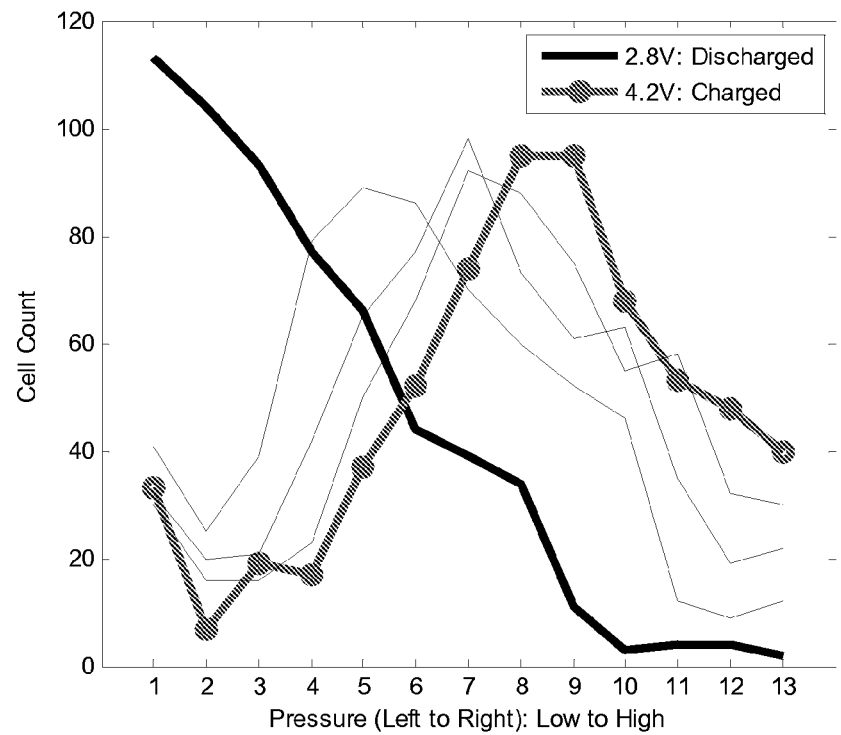
FIG. 8b: Distribution of pressure intensities for Battery B (undamaged battery with high clamping pressure). Line plot for all times/voltages during charging from 2.8V (0 min) to 4.2V (110 min), where the pressure distributions at discharged (2.8V), and charged (4.2V) are indicated respectively by heavy black and red lines.
Figure 8C:
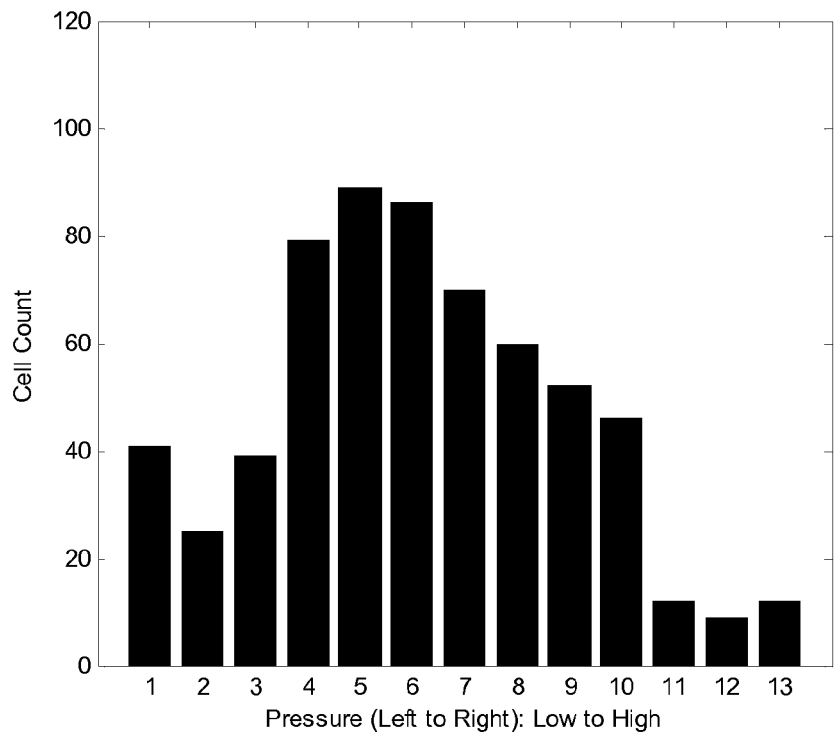
FIG. 8c: Distribution of pressure intensities for Battery B (undamaged battery with high clamping pressure). Bar plot of the pressure distribution at 3.8V (30 min).
Figure 9A:
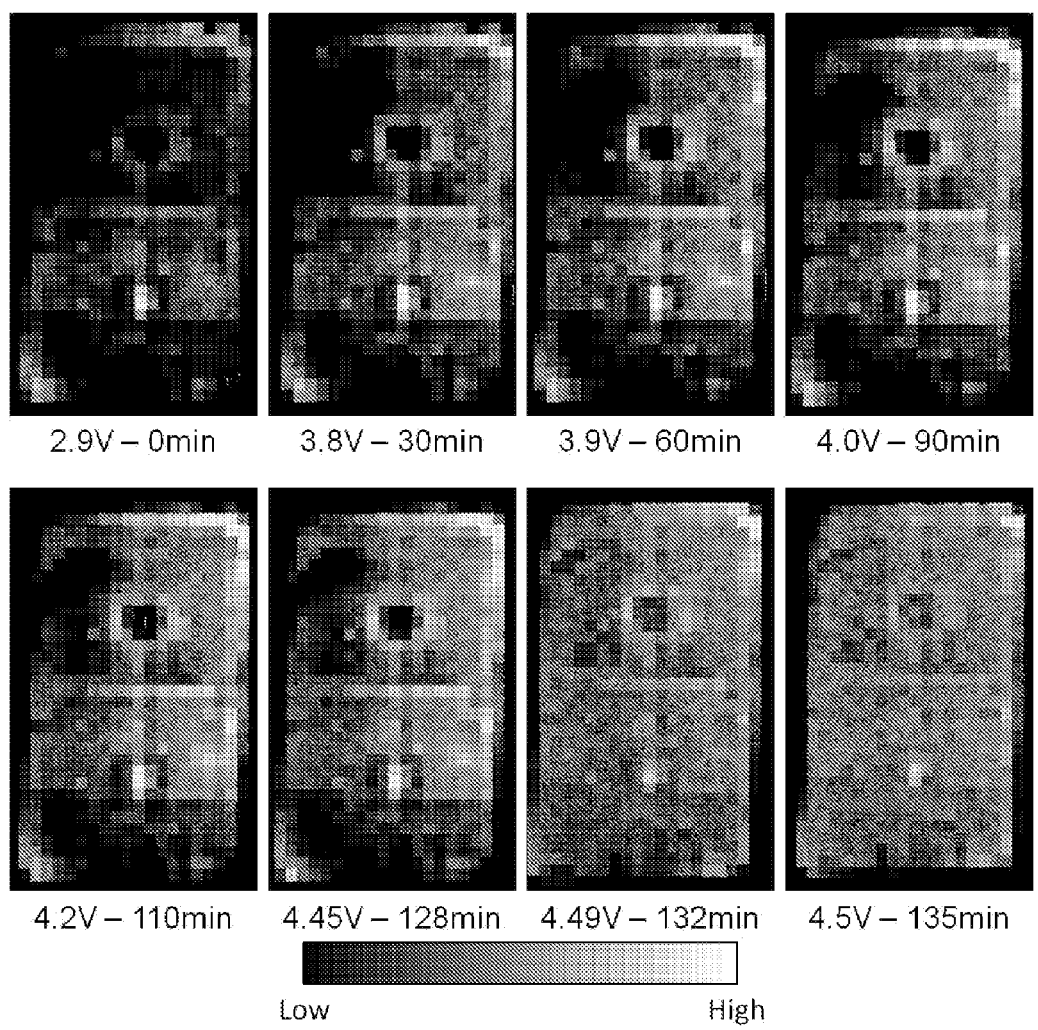
FIG. 9a: Pressure distribution of Battery C (damaged battery with low applied clamping pressure) during charging at 1 A (0.5 C).
Figure 9B:
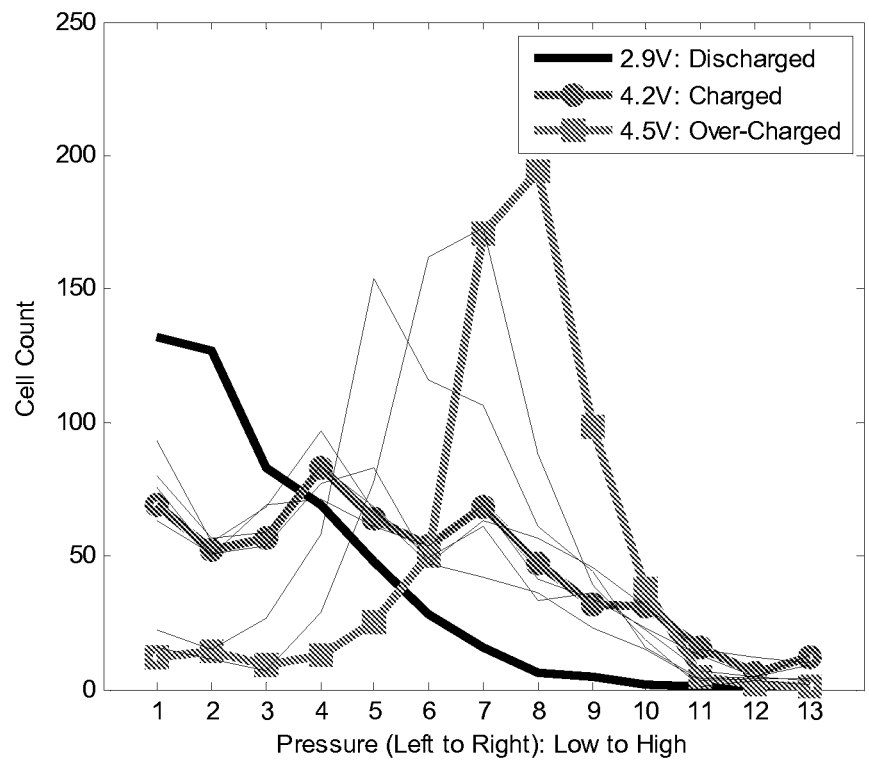
FIG. 9b: Distribution of pressure intensities for Battery C (damaged battery with low clamping pressure). Line plot for all times/voltages during charging from 2.8V (0 min) to 4.5V (135 min), where the pressure distributions at discharged (2.8V), and charged (4.20V) and over-charged (4.5V) are indicated respectively by heavy lines.
Figure 9C:
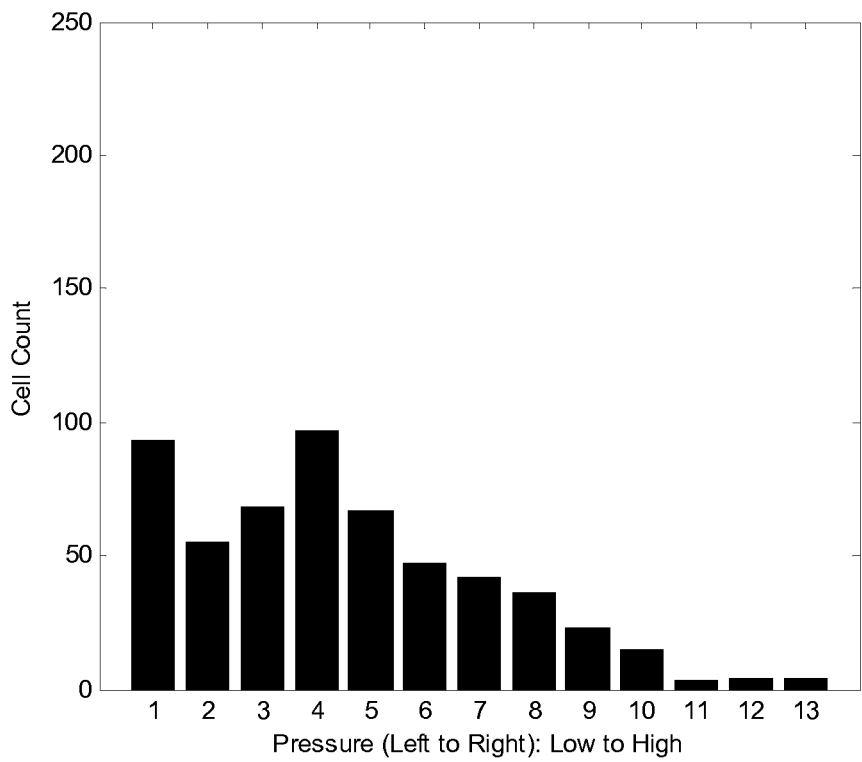
FIG. 9c: Distribution of pressure intensities for Battery C (damaged battery with low clamping pressure). Bar plot of the pressure distribution at 3.8V (30 min).
Figure 10A:
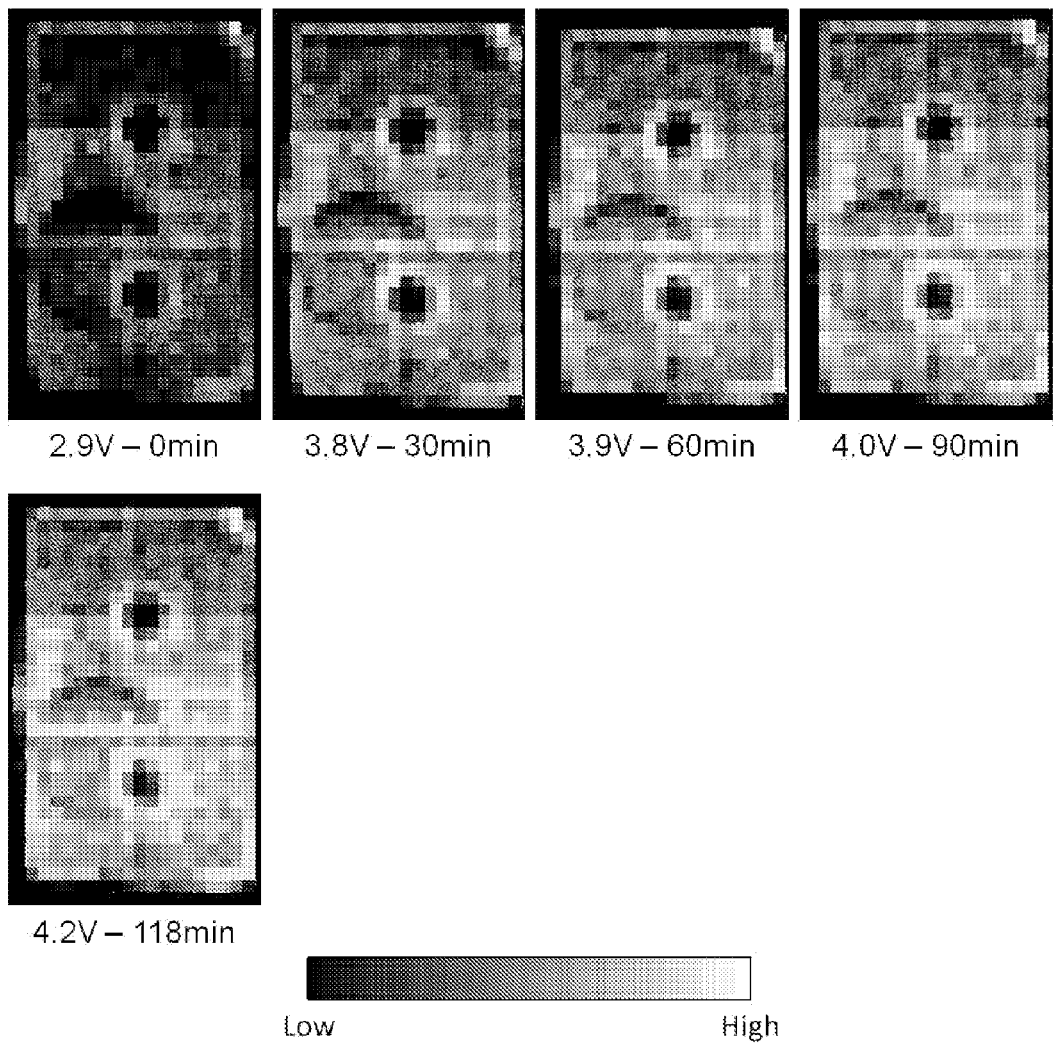
FIG. 10a: Pressure distribution of Battery D (damaged battery with high applied clamping pressure) during charging at 1 A (0.5 C).
Figure 10B:
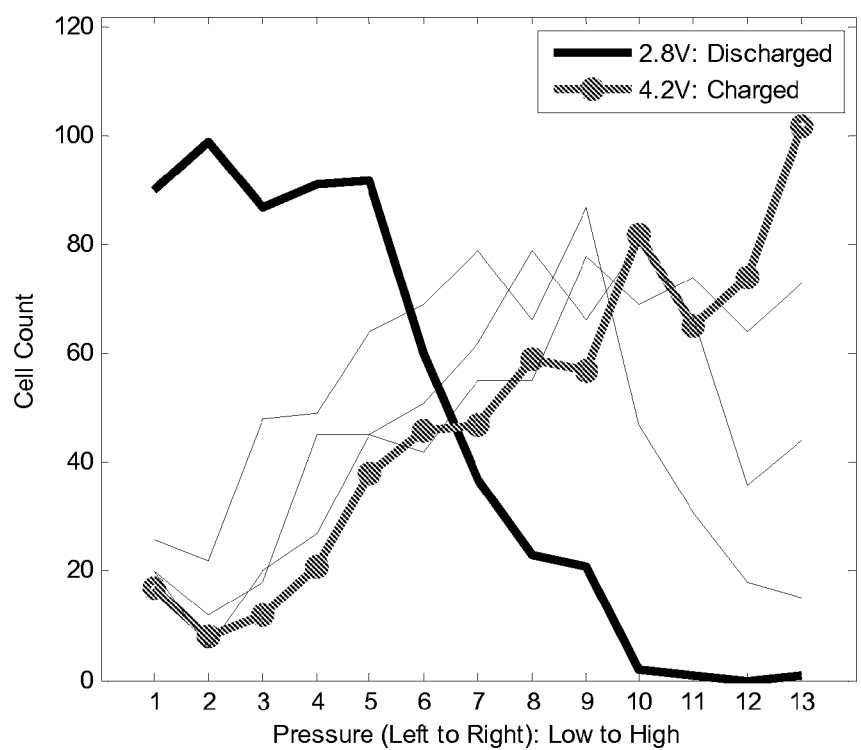
FIG. 10b: Distribution of pressure intensities for Battery D (damaged battery with high clamping pressure). Line plot for all times/voltages during charging from 2.8V (0 min) to 4.2V (118 min), where the pressure distributions at discharged (2.8V), and charged (4.2V) are indicated respectively by heavy lines.
Figure 10C:
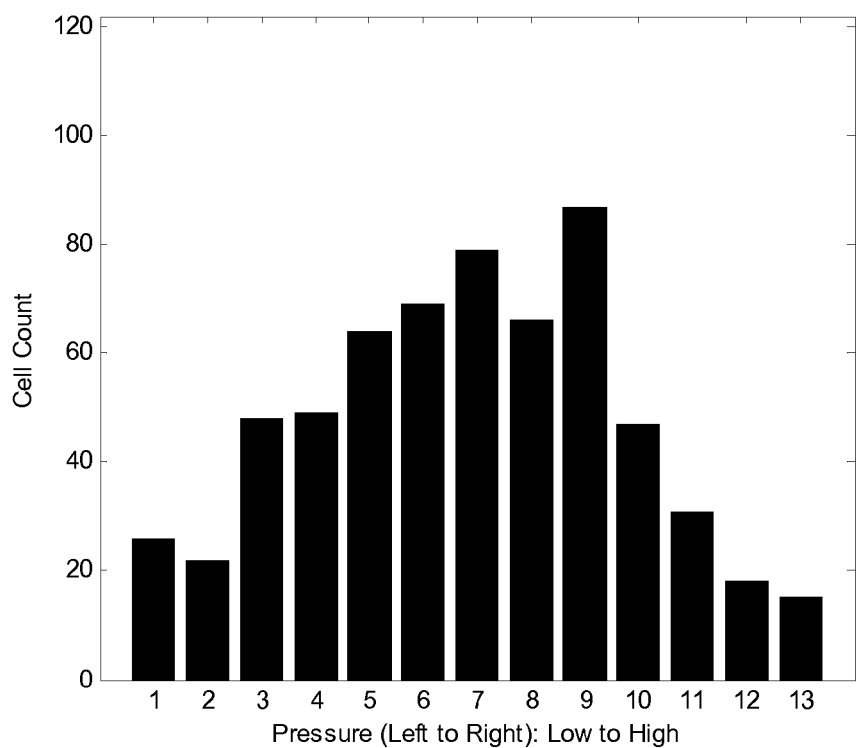
FIG. 10c: Distribution of pressure intensities for Battery D (damaged battery with high clamping pressure). Bar plot of the pressure distribution at 3.8V (30 min).

To account for the clamping pressure on the assembly, the pressure was normalized to the battery pressure at 3.8V, which is in the middle of the operating range of the tested (Kokam) batteries; specifically, $$\text{normalized pressure} = \text{measured pressure} \times \frac{\text{pressure of undamaged cell at 3.8 V}}{\text{pressure of tested battery at 3.8 V}}$$

where a different normalization for the low vs. high clamping pressure. In general, the data for the damaged batteries (Batteries C and D) were normalized to the pressure of the undamaged batteries (Batteries A and B) at 3.8V (3.8V being the voltage of the undamaged batteries at 30 minutes). The data series for the damaged batteries (Batteries C and D) were constructively "moved downward" so that the data points of the damaged batteries "equaled" the data points of the undamaged batteries at 30 minutes. The results of the normalized averaged pressure vs. charging time are shown in FIG. 6. The curves for both the low and high clamping pressures are identical. The data in FIG. 6 tends to demonstrate that the average pressure may be an unreliable indicator for distinguishing between damaged and undamaged batteries. In summary, neither the voltage vs. charging time or the average pressure vs. charging time may be good early reporters of a mild battery damage where there is no visible damage on the outer case of the pouch cell.

The 2D pressure profiles for Batteries A, B, C and D are depicted in FIGS. 7, 8, 9 and 10, respectively. The software package used with the 2D pressure array detector (which in this example was manufactured by Tekscan) provided a color scale of the pressure, and not the actual pressure values. The colors correspond to a maximum pressure of 50 psia (red) and minimum pressure of 0 psia (blue). Using the RGB color values from the 2D image, it is possible to construct a 0 to 13 scale of pressure, where 0 is the lowest pressure and 13 is the highest pressure. For the figures accompanying this document, the color images were converted to grayscale with the grayscale "colors" corresponding to a maximum pressure of 50 psia (white) and minimum pressure of 0 psia (black).

Shown in each of FIGS. 7 through 10 are (a) the pressure distribution (i.e. the color distribution) as a function of time during charging as the battery evolves from an uncharged state to a fully charged state, and for batteries A and C as the battery moves into an overcharged state; (b) a line plot (histogram) reflecting the number of sensels exhibiting a particular pressure at the states of charge represented in figure (a); and (c) a bar chart (histogram) of the pressure distribution at 3.8V, which is in the flat region of the voltage vs. SOC curve. The 2D data shows (i) that the pressure field is heterogeneous, e.g. there is a distribution of blue through red (black through white) sensels, and (ii) the heterogeneity increases as the state of charge increases. Moreover, as the applied pressure of the testing device increases, i.e. batteries B and D vs. batteries A and C, the color distribution in the 2D images moves from blue/green (black in the grayscale representations) towards yellow/orange/red (white in the grayscale representations). The internal components of the tested batteries were also detectable in the 2D pressure distribution, with the higher pressure readings in the band across the center of the image corresponding to a narrow material layer on the inside of the battery used during construction of the battery component.

A statistical analysis of the distributions at 3.6 V and 4.0V are depicted in Tables 1 and 2, respectively. Looking at the images in FIGS. 7 through 10, it can be seen that the batteries with damage tend to exhibit a greater "change" in heterogeneity upon charging as compared to batteries that have not been damaged. One manner in which this observation can be quantified is by statistical evaluation of the data. In one example, differences in the standard deviation, which can be thought of as a measure of the heterogeneity, can be evaluated. For example, a comparison of the standard deviation near the end of the charging cycle (e.g., at 4V) can be compared to the standard deviation near the beginning of the charging cycle (e.g., at 3.6V). This difference is represented in Table 3, where the standard deviation difference for the damaged batteries is greater that for the undamaged batteries. In this way, it is possible to quantify at least some of the visual differences seen in FIGS. 7 through 10.

TABLE 1

Statistics of pressure distribution for undamaged and damaged Kokam batteries at 3.6 V

| Battery | Status | Applied Pressure | Mean 'Color' (i.e. pressure) | Standard Deviation | Standard Deviation over Mean |
|---|---|---|---|---|---|
| A | undamaged | Low | 3.14 | 1.69 | 0.54 |
| B | undamaged | High | 4.63 | 2.58 | 0.56 |
| C | damaged | Low | 3.62 | 2.28 | 0.63 |
| D | damaged | High | 4.99 | 2.54 | 0.51 |

TABLE 2

Statistics of pressure distribution for undamaged and damaged Kokam batteries at 4.0 V

| Battery | Status | Applied Pressure | Mean 'Color' (i.e. pressure) | Standard Deviation | Standard Deviation over Mean |
|---|---|---|---|---|---|
| A | undamaged | Low | 4.08 | 2.00 | 0.49 |
| B | undamaged | High | 7.65 | 2.98 | 0.39 |
| C | damaged | Low | 5.21 | 3.04 | 0.58 |
| D | damaged | High | 8.63 | 3.18 | 0.37 |

TABLE 3

Difference is standard deviation at 4.0 V minus standard deviation at 3.6 V

| Battery | Status | Applied Pressure | Standard Deviation Difference |
|---|---|---|---|
| A | undamaged | Low | 0.31 |
| B | undamaged | High | 0.40 |
| C | damaged | Low | 0.76 |
| D | damaged | High | 0.64 |

If a cell is damaged, it is possible (potentially likely) for the local electrochemistry in the region of damage to behave differently than the electrochemical reaction in regions that have not been damaged. The damage could potentially either increase or decrease the rate of reaction. Since the volume change associated with the intercalation of Lithium in the anode or cathode depends upon the rate of reaction, one would expect a wider distribution of volume changes in cells that have been damaged, at least locally. When a cell is mechanically constrained, such as between two plates as depicted in FIG. 1 or within an outer casing, the wider distribution of volume changes affects a wider distribution of associated pressure changes.

In various embodiments of the present disclosure, the pressure distribution measurements can detect damage caused by a relatively mild compressive force that is difficult (if not impossible) to observe on the exterior of the cell, which in some embodiments includes a soft mylar-like pouch. In some embodiments, there are methods and apparatus for measurement and calculation of the pressure distribution, as well as average pressure, using pressure sensors (such as pressure sensitive array detectors) to monitor one or more performance related characteristics of the battery, such as the state of health (SOH) and/or the state of charge (SOC). The spatial distributions detected can provide important information that is unavailable in average measurements.

In some embodiments, the statistical analysis is performed at one time/charge and then the difference of the two distributions is taken in a manner similar to some previously described technique(s).

Yet other embodiments include additional ways to process the pressure array data. For example, in some embodiments, one subtracts the evolution of the pressure response for each individual sensel and then preforms statistical analysis. In particular embodiments, the initial pressure distribution is subtracted from the measured pressure distribution at all other sampled times, tending to highlight which area(s) of the battery are expanding and/or contracting. This embodiment normalizes results for an individual battery component, as contrasted with normalizing a damaged cell to an undamaged cell. Potential advantages to such embodiments is the ability to obtain an even earlier reporter of damage in a battery, such as a Li-ion battery.

The above embodiments are generally capable of detecting information relating to useful battery characteristics (such as SOC and/or SOH) with batteries that include cells that change volume and/or pressure during charging and/or discharging, such as batteries that operate (at least in part) by intercalation, one example being Li-ion batteries which involve Li intercalation with an associated volume/pressure change. These methods are also capable of working with batteries that have multiple layers (e.g., cathode, electrolyte, separator, anode layers) and complex internal structures.

Although portions of the above discussion are related to the results of testing performed during a typical charge cycle, the ability of embodiments of this disclosure to detect useful battery characteristics (such as SOC and/or SOH) can be enhanced over a battery's lifetime as the battery is subjected to more charge/discharge cycles. As the battery ages (loses capacity) or is damaged, the expansion and contraction will typically become less uniform. A damaged area of a cell will generally fail to conduct electrons because the electrode material has detached from the current collector or because a side reaction has "closed" off "pores" for lithium intercalation causing a loss of capacity (and active material). The inactive areas will not expand or contract as well as the rest of the cell (if at all) and can remain largely unchanged due to their inactivity, which can result in larger pressure gradients in the battery or on the battery's surface.

By evaluating the 2D pressure field, embodiments of the present disclosure are able to detect damage even when the damage cannot be detected (i) visually, (ii) via the voltage vs. charging time response or (iii) via the average pressure vs. charging time. It is believed that the local pressure distribution is, at least in part, caused by differences in the electrochemical rate of reaction that occur because of difference in the molecular or microscopic structure of the various components in the battery cell. Since the electrochemical reactions are capable of either generating or absorbing heat, there should also be an associated local temperature response that may also be detected by various embodiments of the present disclosure.

Figure 11:
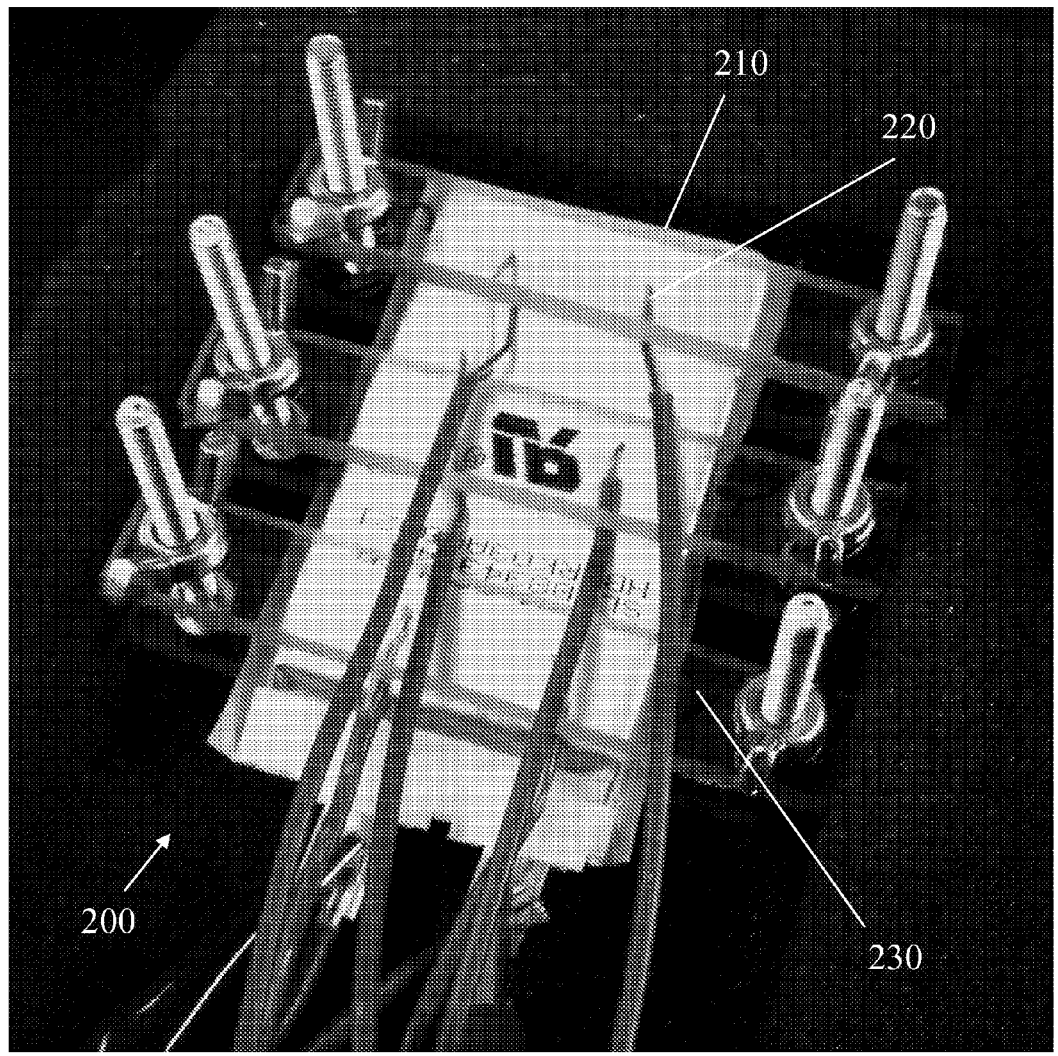
FIG. 11: A battery and sensor device according to another embodiment of the present disclosure including a thermocouple assembly on the outside of pouch of the battery component.

FIG. 11 depicts a battery and sensor device 200 according to another embodiment of the present disclosure. In this embodiment, the temperature response on the outside of a battery cell 210 (e.g. a Kokam battery cell) is measured using one or more temperature sensitive sensors, which may be in an array, e.g., a set of six thermocouples 220. The thermocouples 220 are attached at three location on one side of battery cell 210 and three locations on the other side of the same face of battery cell 210. In the depicted embodiment, the thermocouples 220 are maintained in their respective locations by an external structure, e.g., a series of plates 230, although alternate embodiments maintain the position of the sensors using other means, such as adhesives, brazing, or other bonding techniques. The battery 210 with attached thermocouples 220 was then insulated with 4 inches of foam rubber insulation on all sides.

Figure 12:
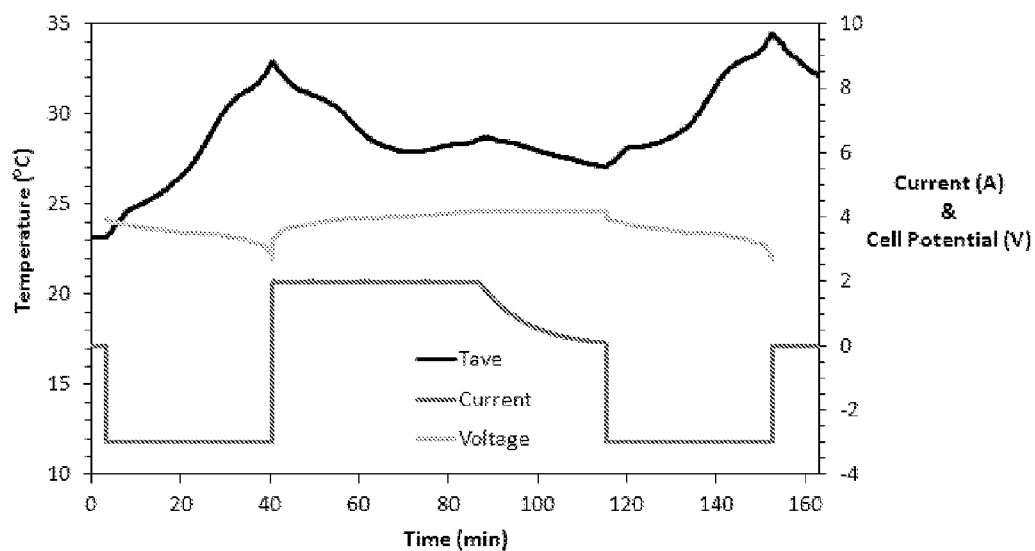
FIG. 12: Voltage, current and average temperature during a charge/discharge cycle of an undamaged battery component.
Figure 13:
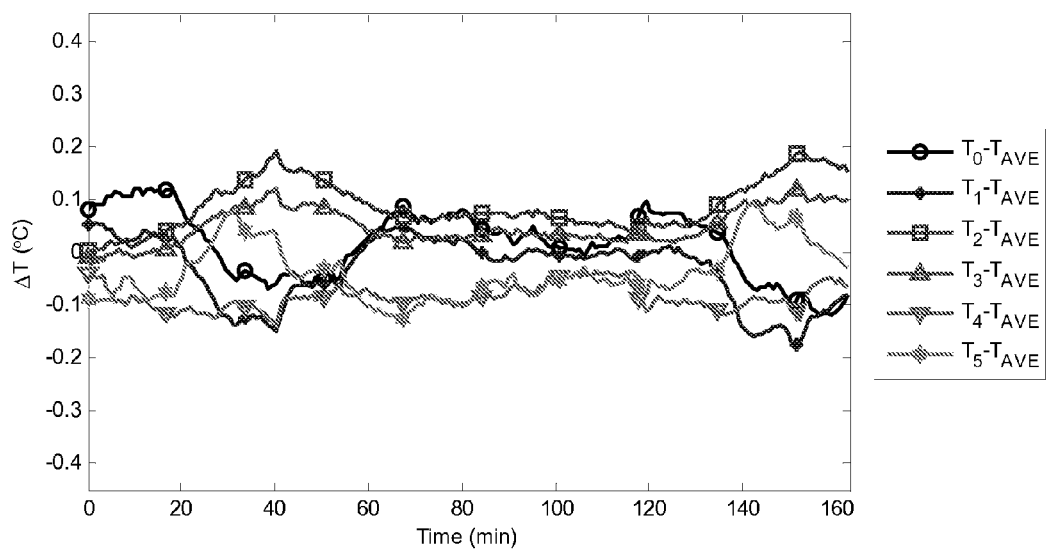
FIG. 13: Thermal deviation from average temperature outside the pouch of an undamaged battery component.
Figure 14:
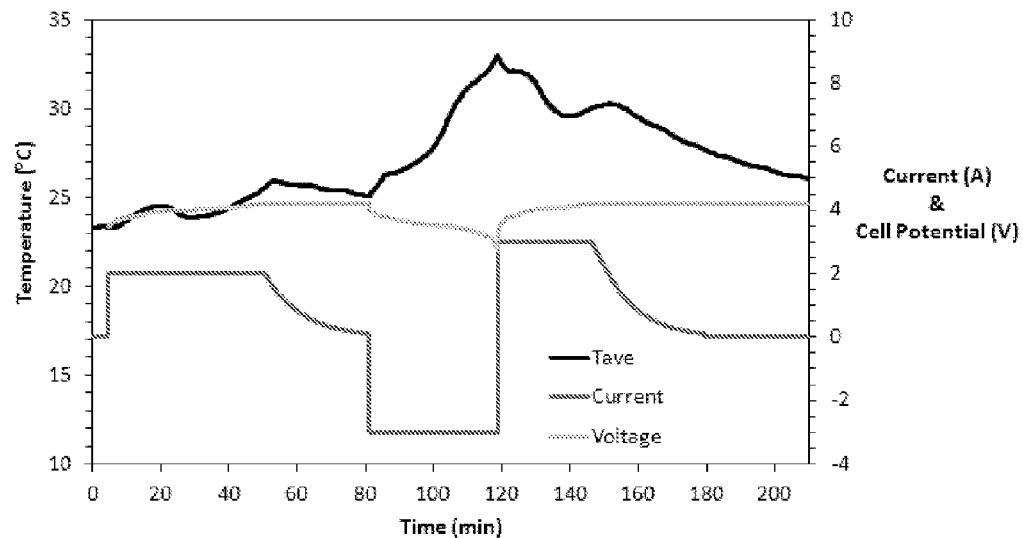
FIG. 14: Voltage, current and average temperature during a charge/discharge cycle of a damaged battery component.
Figure 15:
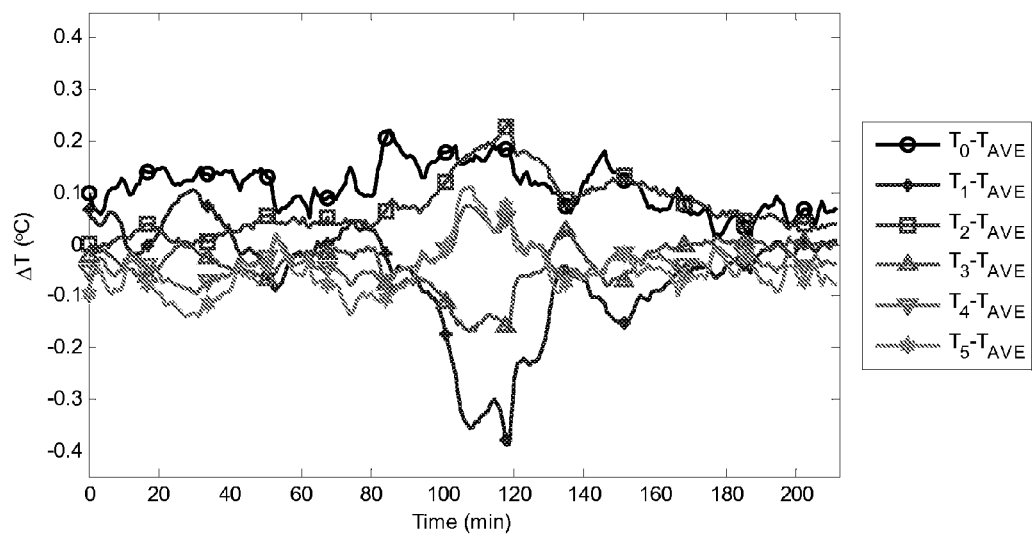
FIG. 15: Thermal deviation from average temperature outside the pouch of a damaged battery component.

In at least one test, the battery and sensor device 200 (battery-thermocouple assembly) was placed through a charge/discharge cycle. The current, voltage and average temperature response are shown in FIGS. 12 and 13 for an undamaged battery, where the average temperature was determined by averaging the response from the six thermocouples. In FIG. 13 the temperature deviations for each of the six thermocouples relative to the average temperature are shown. A positive deviation is observed for thermocouples 1 and 3; however, these are the two thermocouples closest to the positive and negative electrode tabs, where the heat generation expected to be greatest. Similar data are shown in FIGS. 14 and 15 for a similar battery cell (e.g., a Kokam cell) that was damaged according to the same protocol used in Battery C as described above.

The data in FIGS. 12-15 may be used to identify regions of the battery that are not performing properly and serve as an indication of the battery's state of health.

There is a tendency for the local temperatures within the battery's structure or on the battery's surface to dissipate relatively quickly when compared to the tendency of a battery to expand/contract.

To improve the ability to identify regions of the battery that are not performing property and may be damaged (and to also potentially assist in compensating for the transient nature of localized temperatures), embodiments of the present disclosure include temperature sensing arrays with increased sensor density (e.g., an increased number of sensors per square inch) and/or battery monitors that sample the sensors at a higher frequency.

Although various embodiments pertain to two dimensional pressure sensing of batteries, other embodiments include two-dimensional temperature sensing. In some embodiments, a temperature sensitive array detector is used to detect the SOH (such as by identifying regions where the temperature response has changed, regions where the temperature response to charge/discharge becomes more invariant, or hot/cold spots) of one or more batteries. When detecting the two dimensional temperature distribution of a battery, advantages may be realized in embodiments with denser arrays of temperature sensors and/or higher rates of temperature sampling to, for example, compensate for a relatively transient nature of local temperature variations within a battery, which tend to dissipate fairly quickly in various types of batteries such as Li-ion batteries.

Moreover, although much of the above description relates to planar batteries and batteries with planar outer surfaces, alternate embodiments include sensing a two dimensional pressure and/or temperature distribution in other types of batteries, for example, cylindrical batteries and batteries with curved outer surfaces.

Embodiments of the present disclosure include battery monitors that may be used with various types of batteries, such as batteries that exhibit a temperature change and/or a volume change while the battery is charged and/or discharged.

Alternate embodiments of the present disclosure include batteries with 2D pressure and/or temperature monitors incorporated within the structure of the manufactured battery.

Example batteries that may include battery monitors or may be usable with battery monitors as described herein include batteries for electronic devices (such as computer, tablet, and mobile telephone batteries), batteries for larger devices such as electric motors/generators and automobiles, miniature batteries (such as those used in hearing aids), and common household batteries (e.g., D cell, C cell and 9-volt batteries).

Embodiments of the present disclosure detect one or more performance related characteristics (such as the state of health (SOH) and the state of charge (SOC)) of an electrochemical cell by measuring the pressure and/or temperature. Embodiment include electrochemical cells with a tendency to change volume and/or temperature while the cell is charged and/or discharged. Example electrochemical cells that tends to change volume as the cell is charged and/or discharged include electrochemical cells that function at least in part by intercalation, such as lithium ion cells, which include carbon/lithium cobalt dioxide ($LiCoO_2$) cells.

Various Aspects of Different Embodiments of the Present Disclosure are Expressed in Paragraphs X1, X2, X3 and X4 as Follows:

X1. An apparatus for determining a performance related characteristic of an electrochemical cell that stores and releases electrical energy, comprising: a pressure sensing member configured and adapted to sense a change in pressure resulting from the tendency of the electrochemical cell to change volume as the electrochemical cell is charged or discharged; and/or a calculating member that receives pressure information from the pressure sensing member and calculates a performance related characteristic of the electrochemical cell using the received pressure information.

X2. An apparatus for determining a performance related characteristic of an electrochemical cell that stores and releases electrical energy, comprising: a temperature sensing member configured and adapted to sense electrochemical cell temperature; and/or a calculating member that receives temperature information from the temperature sensing member and calculates a performance related characteristic of the electrochemical cell using the received temperature information.

X3. A method for determining a performance related characteristic of an electrochemical cell that stores and releases electrical energy, comprising the acts of: sensing the tendency of an electrochemical cell to change volume as the electrochemical cell is charged or discharged; and/or determining a performance characteristic of the electrochemical cell using said sensing.

X4. A method for determining a performance related characteristic of an electrochemical cell that stores and releases electrical energy, comprising the acts of: sensing the temperature of an electrochemical cell as the electrochemical cell is charged or discharged; and/or determining a performance characteristic of the electrochemical cell using the sensed temperature.

Yet Other Embodiments Pertain to any of the Previous Statements in Paragraphs X1, X2, X3 and X4, which May be Combined with One or More of the Following Other Aspects:

Wherein the pressure sensing member includes a plurality of pressure sensors.

Wherein a plurality of pressure sensors are arranged in a 2-dimensional array.

Wherein a plurality of pressure sensors are arranged in a 3-dimensional array.

Wherein a performance related characteristic of the electrochemical cell is the state of charge of the electrochemical cell.

Wherein a performance related characteristic of the electrochemical cell is the state of health of the electrochemical cell.

Wherein the calculating member calculates localized pressure gradients of the electrochemical cell using the received pressure information.

Wherein the calculating member calculates a pressure distribution of the electrochemical cell using the received pressure information.

Wherein the calculating member calculates one or more pressure distributions of the electrochemical cell using the received pressure information, the one or more pressure distributions being selected from the group consisting of a 2D pressure distribution, a 3D pressure distribution, and a 2D and a 3D pressure distribution.

Wherein the calculating member uses statistical calculations of the received pressure information to calculate a performance related characteristic of the electrochemical cell.

Wherein the statistical calculations include the standard deviation of the electrochemical cell pressure distribution.

Wherein the calculating member receives pressure information from the electrochemical cell while the electrochemical cell is at different states of charge.

Wherein the calculating member compares the pressure information from the electrochemical cell at different states of charge.

Wherein the pressure sensing member and the calculating member detect localized electrochemical cell damage.

Wherein the pressure sensing member is positioned adjacent an external surface of the electrochemical cell.

Wherein the electrochemical cell is positioned at least partially within an external housing, and the pressure sensing member is in contact with an external surface of the external housing.

Wherein the external housing allows expansion of the electrochemical cell, and wherein the pressure sensing member is held against external surface with support member that resists expansion.

Wherein the electrochemical cell is positioned at least partially within an external housing, and the pressure sensing member is positioned within the interior of the external housing.

Wherein the pressure sensing member configured and adapted to sense a change in pressure resulting from the tendency of a plurality of electrochemical cells to change volume as the electrochemical cell is charged or discharged.

An electrochemical cell connected to the pressure sensing member, wherein the electrochemical cell changes volume as the electrochemical cell is charged or discharged.

Wherein the electrochemical cell charges and discharges at least in part by intercalation.

Wherein the electrochemical cell is a Li-ion type cell.

Wherein the temperature sensing member includes a plurality of temperature sensors.

Wherein the plurality of temperature sensors are arranged in a 2-dimensional array.

Wherein the plurality of temperature sensors are arranged in a 3-dimensional array.

Wherein the performance related characteristic of the electrochemical cell is the state of charge of the electrochemical cell.

Wherein the performance related characteristic of the electrochemical cell is the state of health of the electrochemical cell.

Wherein the calculating member calculates localized temperature gradients of the electrochemical cell using the received temperature information.

Wherein the calculating member calculates a temperature distribution of the electrochemical cell using the received temperature information.

Wherein the calculating member calculates one or more temperature distributions of the electrochemical cell using the received temperature information, the one or more temperature distributions being selected from the group consisting of a 2D temperature distribution, a 3D temperature distribution, and a 2D and a 3D temperature distribution.

Wherein the calculating member uses statistical calculations of the received temperature information to calculate a performance related characteristic of the electrochemical cell.

Wherein the statistical calculations include the standard deviation of the electrochemical cell temperature distribution.

Wherein the calculating member receives temperature information from the electrochemical cell while the electrochemical cell is at different states of charge.

Wherein the calculating member compares the temperature information from the electrochemical cell at different states of charge.

Wherein the temperature sensing member and the calculating member detect localized electrochemical cell damage.

Wherein the temperature sensing member is positioned adjacent an external surface of the electrochemical cell.

Wherein the electrochemical cell is positioned at least partially within an external housing, and the temperature sensing member is in contact with an external surface of the external housing.

Wherein the electrochemical cell is positioned at least partially within an external housing, and the temperature sensing member is positioned within the interior of the external housing.

An electrochemical cell connected to the temperature sensing member.

Wherein said sensing includes sensing a pressure associated with the electrochemical cell's tendency to change volume as the electrochemical cell is charged or discharged.

Wherein said sensing includes sensing a plurality of pressures associated with the electrochemical cells' tendency to change volume as the electrochemical cell is charged or discharged.

Wherein said sensing is performed at a plurality of locations arranged in a 2-dimensional array.

Wherein said sensing is performed at a plurality of locations arranged in a 3-dimensional array.

Wherein said determining includes determining the state of charge of the electrochemical cell.

Wherein said determining includes determining the state of health of the electrochemical cell.

Wherein said determining includes determining the localized pressure gradients of the electrochemical cell.

Wherein said determining includes determining a pressure distribution of the electrochemical cell.

Wherein said determining includes determining a 2D pressure distribution of the electrochemical cell.

Wherein said determining includes performing a statistical evaluation of information obtained from said sensing.

Wherein the performing of a statistical evaluation includes evaluating the standard deviation of the information obtained from said sensing.

Wherein said sensing includes sensing a pressure associated with the electrochemical cell's tendency to change volume at a first state of charge and sensing a pressure associated with the electrochemical cell's tendency to change volume at a second state of charge.

Wherein said determining includes comparing the pressure associated with the electrochemical cell's tendency to change volume at the first state of charge and the pressure associated with the electrochemical cell's tendency to change volume at the second state of charge.

Detecting localized electrochemical cell damage.

Constraining the electrochemical cell from changing volume as the electrochemical cell is charged or discharged.

Wherein said sensing includes sensing the tendency of a plurality of electrochemical cells to change volume as the electrochemical cells are charged or discharged, and wherein said determining includes determining a performance characteristic of the electrochemical cells using said sensing.

Wherein said sensing includes sensing a plurality of temperatures associated with the electrochemical cells' tendency to change volume as the electrochemical cell is charged or discharged.

Wherein said sensing is performed at a plurality of locations arranged in a 2-dimensional array.

Wherein said sensing is performed at a plurality of locations arranged in a 3-dimensional array.

Wherein said determining includes determining the state of charge of the electrochemical cell.

Wherein said determining includes determining the state of health of the electrochemical cell.

Wherein said determining includes determining the localized temperature gradients of the electrochemical cell.

Wherein determining includes determining a temperature distribution of the electrochemical cell.

Wherein said determining includes determining a 2D temperature distribution of the electrochemical cell.

Wherein said determining includes performing a statistical evaluation of information obtained from said sensing.

Wherein the performing of a statistical evaluation includes evaluating the standard deviation of the information obtained from said sensing.

Wherein said sensing includes sensing a temperature of the electrochemical cell at a first state of charge and sensing a temperature of the electrochemical cell at a second state of charge.

Wherein said determining includes comparing the temperature at the first state of charge and the temperature at the second state of charge.

Wherein said sensing includes sensing the tendency of a plurality of electrochemical cells to change temperature as the electrochemical cells are charged or discharged, and wherein said determining includes determining a performance characteristic of the electrochemical cells using said sensing.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Features of one embodiment may be used in combination with features of other embodiments as would be understood by one of ordinary skill in the art, whether or not explicitly described as such. One or more exemplary embodiments have been shown and described, and all changes and modifications that come within the spirit of the disclosure are desired to be protected.

What is claimed is:

1. An apparatus for detecting damage to a rechargeable battery, comprising:
    a pressure sensing member configured and adapted to sense a two dimensional pressure distribution on a surface of a rechargeable battery, the pressure sensing member including a plurality of pressure sensors, each said pressure sensor configured and adapted to sense a corresponding localized surface expansion or contraction of the battery and provide a signal;
    a computer having software that receives the plurality of signals from the pressure sensing member, the software using the heterogeneity of the signals to identify damage to the battery.

2. The apparatus of claim 1, wherein the plurality of pressure sensors are arranged in a 3-dimensional array.

3. The apparatus of claim 1, wherein the software calculates localized pressure gradients of the battery using the received plurality of signals.

4. The apparatus of claim 1, wherein the software calculates a pressure distribution of the battery using the received plurality of signals.

5. The apparatus of claim 4, wherein the software calculates one or more pressure distributions of the battery using the received plurality of signals, the one or more pressure distributions being selected from the group consisting of a 2D pressure distribution, a 3D pressure distribution, and a 2D and a 3D pressure distribution.

6. The apparatus of claim 1, wherein the software uses statistical calculations of the received pressure information to identify damage to the battery.

7. The apparatus of claim 6, wherein the statistical calculations include the standard deviation of the plurality of signals.

8. The apparatus of claim 1, wherein the software receives the plurality of signals from the battery while the battery is at different states of charge.

9. The apparatus of claim 8, wherein the software compares the plurality of signals from the battery at different states of charge.

10. The apparatus of claim 1, wherein the pressure sensing member is positioned adjacent an external surface of the battery.

11. The apparatus of claim 1, wherein the battery is positioned at least partially within an external housing, and the pressure sensing member is in contact with an external surface of the external housing.

12. The apparatus of claim 11, wherein the external housing allows expansion of the battery, and wherein the pressure sensing member is held against an external surface with a support member that resists expansion.

13. The apparatus of claim 1, wherein the battery is positioned at least partially within an external housing, and the pressure sensing member is positioned within the interior of the external housing.

14. The apparatus of claim 1, wherein the pressure sensing member is configured and adapted to sense a change in pressure resulting from the tendency of the battery to change volume as the battery is charged or discharged.

15. The apparatus of claim 1 wherein the battery is a Lithium-ion battery.

16. The apparatus of claim 15 wherein the expansion or contraction of the battery results from intercalation of Li ions.

17. The apparatus of claim 16 wherein the software receives a first plurality of signals when the battery is charged to a first voltage, a second plurality of signals when the battery is charged to a second voltage different than the first voltage, and the software uses the difference in heterogeneity of the first plurality compared to the heterogeneity of the second plurality to identify damage.

18. The apparatus of claim 1 wherein the software receives a first plurality of signals when the battery is charged to a first voltage, a second plurality of signals when the battery is charged to a second voltage different than the first voltage, and the software uses the difference in heterogeneity of the first plurality compared to the heterogeneity of the second plurality to identify damage.

* * * * *